US012619324B2

(12) United States Patent
Jung

(10) Patent No.: US 12,619,324 B2
(45) Date of Patent: May 5, 2026

(54) TOUCH SENSING DISPLAY APPARATUS

(71) Applicant: LG Display Co., Ltd., Seoul (KR)

(72) Inventor: So Jung Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/940,245

(22) Filed: Nov. 7, 2024

(65) Prior Publication Data

US 2025/0238092 A1 Jul. 24, 2025

(30) Foreign Application Priority Data

Jan. 24, 2024 (KR) ........................ 10-2024-0010819

(51) Int. Cl.
*G06F 3/041* (2006.01)

(52) U.S. Cl.
CPC .................................. *G06F 3/041* (2013.01)

(58) Field of Classification Search
CPC .... G06F 3/041; G06F 3/04166; G06F 3/0443; G06F 3/0446; G06F 3/0412; G06F 1/325; G06F 3/0416
See application file for complete search history.

(56) References Cited

U.S. PATENT DOCUMENTS

2018/0150177 A1* 5/2018 Hwang ................... G06F 3/044
2019/0179487 A1* 6/2019 Kong .................... G06F 3/0418
2021/0200413 A1* 7/2021 Jang ..................... G06F 3/04182
2025/0111060 A1* 4/2025 Durham ............... G06F 21/602

FOREIGN PATENT DOCUMENTS

KR 10-2013-0051877 A 5/2013
KR 10-2014-0073827 A 6/2014

* cited by examiner

*Primary Examiner* — Temesghen Ghebretinsae
*Assistant Examiner* — Sosina Abebe
(74) *Attorney, Agent, or Firm* — Seed Intellectual Property Law Group LLP

(57) ABSTRACT

A touch sensing display device includes a display panel including a plurality of touch blocks which are divided into at least one active touch block and at least one inactive touch block with respect to a touch input position and each touch block provided with a plurality of touch nodes and a plurality of sensing circuits configured to full-sense touch nodes of the active touch block for a first time and half-sense touch nodes of the inactive touch block for a second time, based on a touch driving signal, wherein the first time corresponds to entire pulse periods of the touch driving signal, and the second time corresponds to odd pulse periods or even pulse periods of the touch driving signal.

11 Claims, 15 Drawing Sheets

SSN

TOUCH NODE HALF SENSING (EVEN)                    TN

< ET >

ADC Out Data          Bit Shifted Data        Touch Data
(BIN) 0011_0010       (BIN) 0110_0100         (BIN) 0110_0100
(DEC) 50              (DEC) 100               (DEC) 100

TOUCH SENSING DISPLAY APPARATUS

CROSS-REFERENCE TO RELATED APPLICATIONS

This application claims the benefit of the Korean Patent Application No. 10-2024-0010819 filed on Jan. 24, 2024, which is hereby incorporated by reference as if fully set forth herein.

BACKGROUND

Technical Field

The present disclosure relates to a touch sensing display device.

Description of the Related Art

Touch sensing display device may recognize a touch input of a user applied to a display panel and may perform various application functions based thereon.

Touch sensing display device may include a plurality of touch nodes, which are disposed in a display panel for touch recognition, and a touch circuit which drives the touch nodes. The touch circuit may supply a touch driving signal to the touch nodes and may detect electric charge magnitudes of the touch nodes based on the touch driving signal to calculate touch coordinates corresponding to a touch input.

In such touch sensing display device, touch sensing is performed on all touch nodes each time regardless of a region where a touch input occurs currently.

BRIEF SUMMARY

The present disclosure provides a touch sensing display device which may decrease power consumption.

As embodied and broadly described herein, a touch sensing display device includes a display panel including a plurality of touch blocks which are divided into at least one active touch block and at least one inactive touch block with respect to a touch input position and each touch block provided with a plurality of touch nodes and a plurality of sensing circuits configured to full-sense touch nodes of the active touch block for a first time and half-sense touch nodes of the inactive touch block for a second time, based on a touch driving signal, wherein the first time corresponds to entire pulse periods of the touch driving signal, and the second time corresponds to odd pulse periods or even pulse periods of the touch driving signal.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
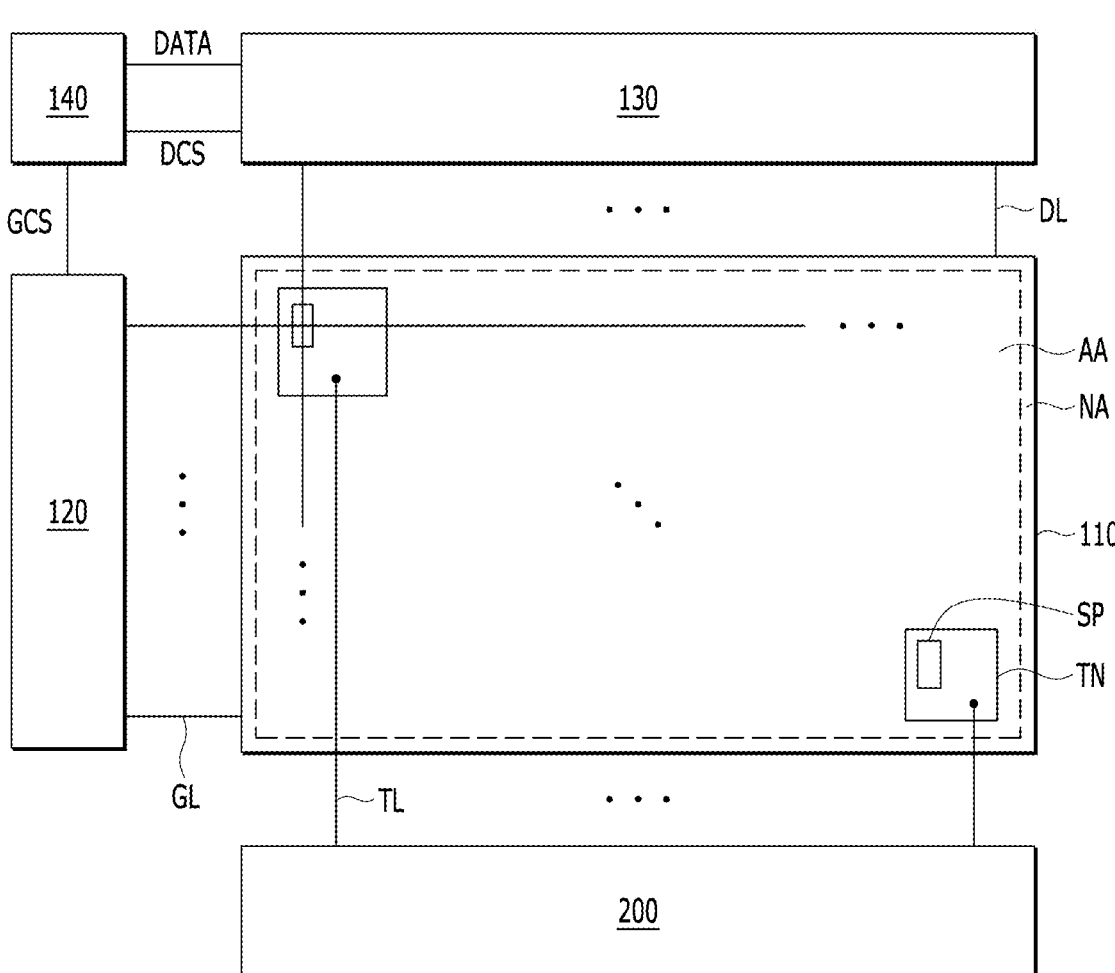
FIG. 1 is a diagram schematically illustrating a touch sensing display device according to the present disclosure.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise," "having," "including" and the like suggest that other parts can be added unless the term "only" is used. As used herein, the singular forms "a," "an," and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~," "over~," "under~." and "next~," one or more other parts may be disposed between the two parts unless "just" or "direct" is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a diagram schematically illustrating a touch sensing display device 100 according to the present disclosure.

Referring to FIG. 1, the touch sensing display device 100 according to the present disclosure may provide a display function of reproducing an input image on a screen thereof and a touch sensing function of sensing a touch input of a user.

The touch sensing display device 100 may include a display panel 110 where a plurality of data lines DL and a plurality of gate lines GL are provided, a display driving circuit for driving the display panel 110, and a timing controller 140.

In terms of functions, the display driving circuit may be divided into a gate driving circuit 120 for driving the gate lines GL and a data driving circuit 130 for driving the data lines DL. The display driving circuit may be implemented as one or more integrated circuits (ICs).

The display panel 110 may include an active region AA where a plurality of subpixels SP are provided and a non-active region NA which is disposed outside the active region AA. Each of a plurality of touch nodes TN may be disposed in a region corresponding to two or more subpixels SP. A touch node TN may be referred to as a touch electrode.

The plurality of data lines DL and the plurality of gate lines GL may be disposed in the display panel 110, and subpixels SP may be provided in areas defined by intersections between the data lines DL and the gate lines GL. A plurality of touch lines TL electrically connected to the plurality of touch nodes TN may be further disposed in the display panel 110.

First, elements for display driving in the touch sensing display device 100 will be described below.

The gate driving circuit 120 may be controlled by the timing controller 140 and may sequentially output a scan signal to the plurality of gate lines GL disposed in the display panel 110 to control a driving timing of each of the plurality of subpixels SP.

The gate driving circuit 120 may include one or more gate driver integrated circuits (GDICs), and the GDICs may be disposed at only one side of the display panel 110 or both sides of the display panel 110, based on a driving type.

Each of the GDICs may be connected to a bonding pad of the display panel 110 in a tape automated bonding (TAB) type or a chip on glass (COG) type. Alternatively, each GDIC may be implemented as a gate in panel (GIP) type and may be directly disposed in the display panel 110. Alternatively, each GDIC may be integrated and disposed in the display panel 110. Alternatively, each GDIC may be implemented as a chip on film (COF) type mounted on a film connected to the display panel 110.

The data driving circuit 130 may receive image data from the timing controller 140 and may convert the image data into analog data voltages. The data driving circuit 130 may output the data voltages to the data lines DL in synchronization with a timing at which the scan signal is applied through the gate lines GL and may thus allow the subpixels SP to implement brightness based on the image data.

The data driving circuit 130 may include one or more source driver integrated circuits (SDICs). Each of the SDICs may include a shift register, a latch circuit, a digital-to-analog converter (DAC), and an output buffer.

Each SDIC may be connected to a bonding pad of the display panel 110 in the TAB type or the COG type. Alternatively, each SDIC may be directly disposed in the display panel 110. Alternatively, each SDIC may be integrated and disposed in the display panel 110. Alternatively, each SDIC may be implemented as the COF type. In this case, each SDIC may be mounted on a film connected to the display panel 110 and may be electrically connected to the display panel 110 through lines of the film.

The timing controller 140 may supply various control signals to the gate driving circuit 120 and the data driving circuit 130 and may control operation timings of the gate driving circuit 120 and the data driving circuit 130.

The timing controller 140 may be mounted on a printed circuit board (PCB) or a flexible PCB and may be electrically connected to the gate driving circuit 120 and the data driving circuit 130 through the PCB or the FPCB.

The timing controller 140 may allow the gate driving circuit 120 to output the scan signal, based on a timing set in each frame, and may allow the data driving circuit 130 to convert image data into data voltages and output the data voltages in synchronization with the scan signal.

The timing controller 140 may receive, from the outside (for example, a host system), various timing signals including a vertical synchronization signal VSYNC, a horizontal synchronization signal HSYNC, an input data enable signal DE, and a clock signal CLK along with the image data.

The timing controller 140 may generate a gate control signal GCS and a data control signal DCS by using the various timing signals received from the outside, may output the gate control signal GCS to the gate driving circuit 120, and may output the data control signal DCS to the data driving circuit 130.

The gate control signal GCS may include a gate start pulse GSP, a gate shift clock GSC, and a gate output enable signal GOE. The gate start pulse GSP may control an operation start timing of each of one or more GDICs configuring the gate driving circuit 120. The gate shift clock GSC may be a clock signal which is input to one or more GDICs in common and may control a shift timing of the scan signal. The gate output enable signal GOE may control an output timing of each of one or more GDICs.

The data control signal DCS may include a source start pulse SSP, a source sampling clock SSC, and a source output enable signal SOE. The source start pulse SSP may control a data sampling start timing of each of one or more SDICs configuring the data driving circuit 130. The source sampling clock SSC may be a clock signal which controls a sampling timing of data in each SDIC. The source output enable signal SOE may control an output timing of the data driving circuit 130.

The touch sensing display device 100 may further include a power management IC which supplies various voltages or currents to the display panel 110, the gate driving circuit 120, and the data driving circuit 130, or controls various voltages or currents which are to be supplied.

Hereinafter, elements for touch sensing driving in the touch sensing display device 100 will be described below.

The touch sensing display device 100 may include a touch screen panel where a plurality of touch nodes TN are disposed for touch sensing and a touch circuit 200 which drives and senses the touch screen panel.

The touch screen panel may be an external type where the touch screen panel is manufactured independently from the display panel 110 and is bonded to the display panel 110, or may be an internal type where the touch screen panel is manufactured together in a manufacturing process of the display panel 110 and is provided in the display panel 110. In the touch sensing display device 100 according to the present disclosure, the touch screen panel may be an independent panel including the touch sensing function, or may denote the display panel 110 which has all of the touch sensing function and the display function. Hereinafter, the internal type where the touch screen panel is in the display panel 110 will be described for example.

The touch circuit 200 may drive and sense the plurality of touch nodes TN disposed in the display panel 100. The touch circuit 200 may supply a touch driving signal to the touch nodes TN, may receive and accumulate a touch sensing signal from the touch nodes TN, and may detect touch coordinates and whether there is a touch, based on a touch sensing accumulated signal. The touch circuit 200 may be implemented as one element or two or more elements (for example, ICs) and may be implemented independently from the display driving circuit. Also, all or a portion of the touch circuit 200 may be integrated and implemented in the display driving circuit or an internal circuit thereof. For example, a portion of the touch circuit 200 may be implemented as an IC along with the data driving circuit 130.

The touch node TN may be an electrode which is disposed by dividing a common electrode for display driving. In this case, the touch node TN may perform a function of an electrode for touch sensing and a function of an electrode for display sensing.

The touch circuit 200 may supply the touch driving signal to the touch node TN in a temporally divided display driving period or touch driving period to perform touch sensing.

Figure 2:
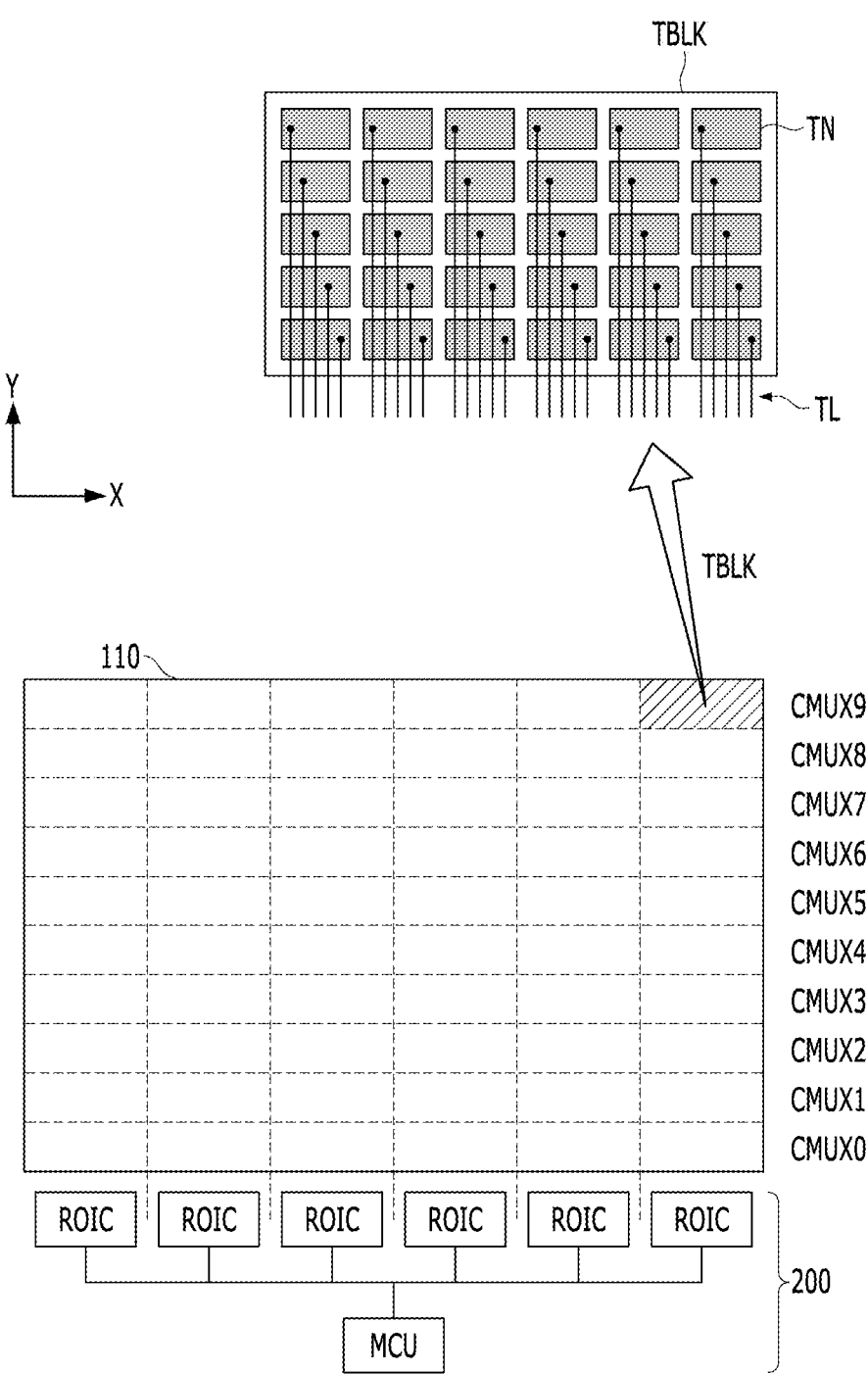
FIG. 2 is a diagram illustrating a matching configuration between a touch circuit and a touch block according to the present disclosure.

FIG. 2 is a diagram illustrating a matching configuration between a touch circuit 200 and a touch block according to the present disclosure.

Referring to FIG. 2, the touch circuit 200 according to the present disclosure may include a micro control unit (MCU) and a readout IC (ROIC).

The display panel 110 may be divided into a plurality of columns in an X-axis direction to correspond to a plurality of ROICs and may be divided into a plurality of rows in a Y-axis direction to correspond to a plurality of channel multiplexers CMUX0 to CMUX9. Each channel multiplexer may select a touch block TBLK of a corresponding row. Each ROIC may drive and sense a touch block TBLK selected by a channel multiplexer from among touch blocks TBLK of a corresponding row.

Each touch block TBLK may include a plurality of touch nodes TN. Each of the plurality of touch nodes TN may be connected to a touch line TL. The number of touch lines TL may be equal to the number of touch nodes TN. The touch lines TL may be connected to sensing circuits (SSU of FIG. 3) of the ROIC through a selected channel multiplexer.

The sensing circuits (SSU of FIG. 3) of the ROIC may be connected to one of touch blocks TBLK of a corresponding row through one of the plurality of channel multiplexers CMUX0 to CMUX9. For example, the sensing circuits (SSU of FIG. 3) of the ROIC may be selectively connected to a touch block TBLK of a first row through the channel multiplexer CMUX0 and may be selectively connected to a touch block TBLK of a second row through the channel multiplexer CMUX1. Likewise, the sensing circuits (SSU of FIG. 3) of the ROIC may be selectively connected to a touch block TBLK of a tenth row through the channel multiplexer CMUX9.

Figure 3:
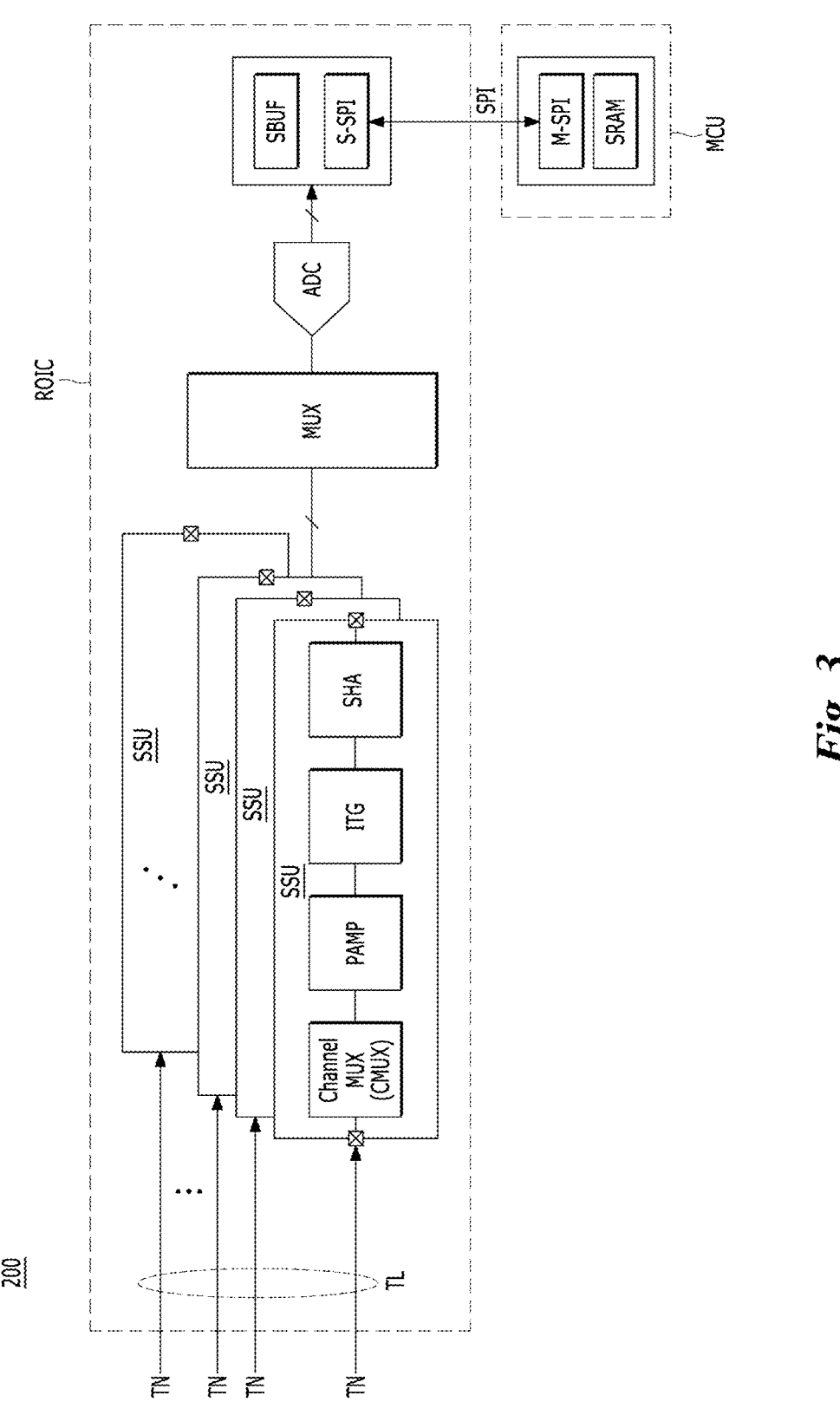
FIG. 3 is a diagram illustrating some elements of a touch circuit according to the present disclosure.

FIG. 3 is a diagram illustrating some elements of a touch circuit 200 according to the present disclosure.

Referring to FIG. 3, an ROIC may include sensing circuits SSU for individually sensing touch nodes TN included in one touch block TBLK at a time while one channel multiplexer CMUX is operating. The number of sensing circuits SSU may correspond to the number of touch lines TL or may correspond to the number of touch nodes TN.

Each of sensing circuits SSU may include a preamplifier circuit PAMP, an integral circuit ITG, and a sample and hold circuit SHA. The preamplifier circuit PAMP and the integral circuit ITG may accumulate a touch sensing signal of a connected touch node TN, based on a touch driving signal. The sample and hold circuit SHA may store and output a final accumulated touch sensing accumulated signal.

A plurality of touch sensing accumulated signals output from the sensing circuits SSU may be sequentially selected one-by-one through an output multiplexer MUX and may then be input to an ADC. The ADC may convert the touch sensing accumulated signal, input through the output multiplexer MUX, into a digital value and may store converted touch sensing data in a buffer memory SBUF.

An MCU and the ROIC may be connected to each other through a serial peripheral interface (SPI) and may transfer and receive relevant control signals and touch sensing data therebetween. In an SPI communication scheme, the MCU may be a master device, and the ROIC may be a slave device. The MCU may include a master SPI port M-SPI, and the ROIC may include a slave SPI port S-SPI. The master SPI port M-SPI and the slave SPI port S-SPI may be connected to each other through a plurality of transfer lines.

The MCU may calculate touch coordinates corresponding to a touch input position, based on the touch sensing data. The MCU may store a touch coordinate value in an internal memory SRAM.

Figure 4:
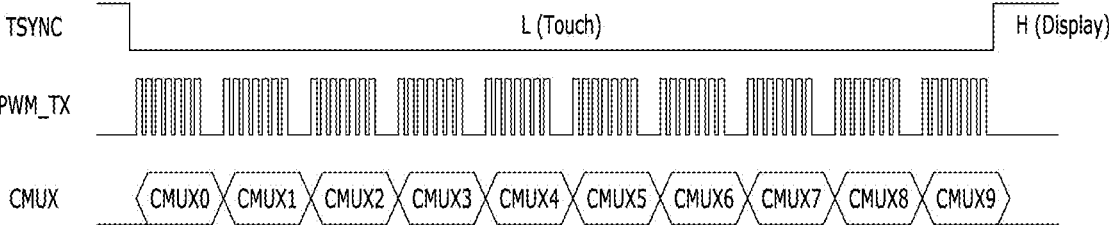
FIG. 4 is a diagram illustrating an example where a plurality of touch blocks are time-divisionally sensed based on a channel multiplexer signal.

FIG. 4 is a diagram illustrating an example where a plurality of touch blocks are sequentially selected one-by-one and time-divisionally sensed, based on a channel multiplexer.

Referring to FIG. 4, a touch sensing operation and a display operation may be temporally divided with respect to a touch synchronization signal TSYNC. The touch sensing operation may correspond to a low period L of the touch synchronization signal TSYNC. The display operation may correspond to a high period H of the touch synchronization signal TSYNC. The touch synchronization signal TSYNC may be generated by an MCU and may then be transferred to an ROIC through SPI communication.

Sensing circuits SSU of the ROIC may be activated in operation in the low period L of the touch synchronization signal TSYNC. During the low period L of the touch synchronization signal TSYNC, the sensing circuits SSU of the ROIC may be sequentially connected to one of touch blocks TBLK of a corresponding column though channel multiplexers CMUX0 to CMUX9 and may sequentially sense the touch blocks TBLK of the corresponding column.

Figure 5:
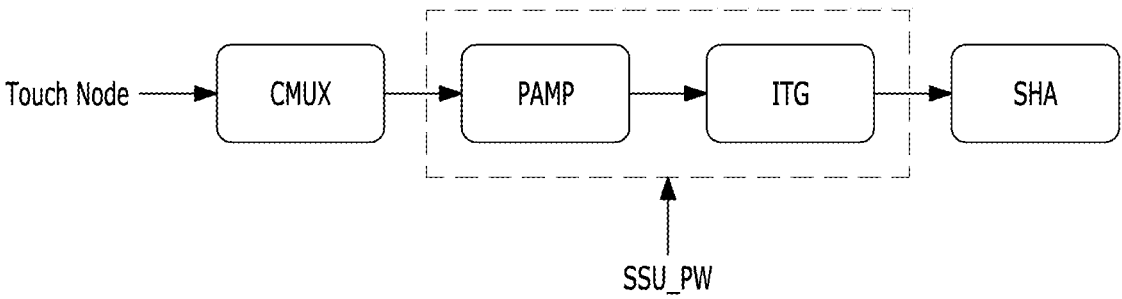
FIG. 5 is a diagram illustrating a configuration of a sensing circuit individually connected to each touch node of a touch block.
Figure 6:
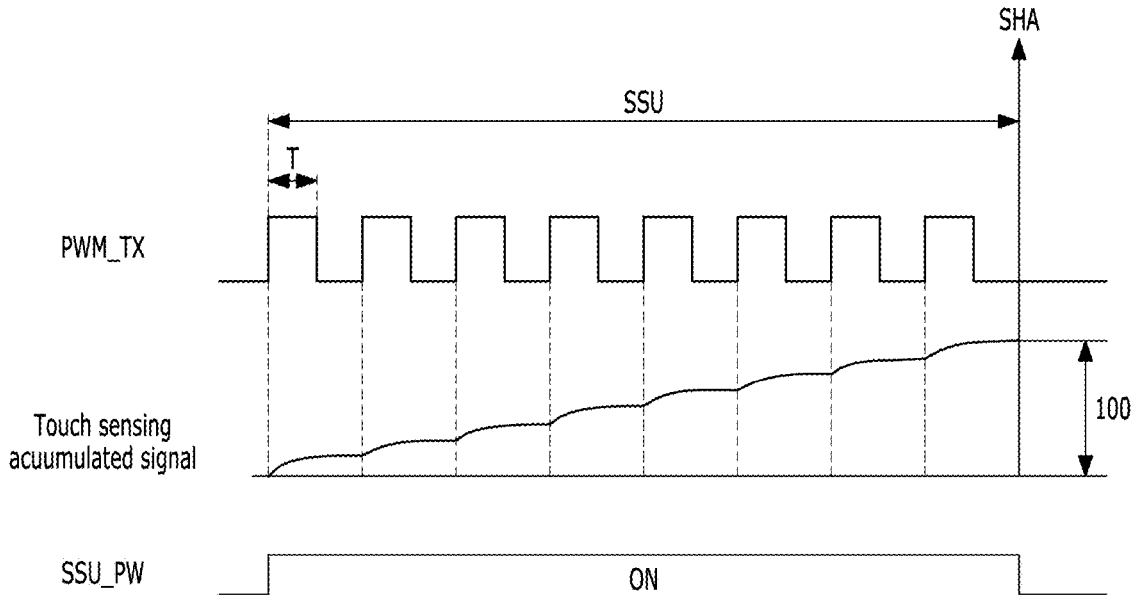
FIG. 6 is a diagram for describing a touch sensing operation of one sensing circuit.

FIG. 5 is a diagram illustrating a configuration of a sensing circuit individually connected to each touch node of a touch block. FIG. 6 is a diagram for describing a touch sensing operation of one sensing circuit.

Referring to FIGS. 5 and 6, a touch node of a touch block selected through a channel multiplexer CMUX may be connected to one sensing circuit SSU. The one sensing circuit SSU may supply a touch driving signal PWM_TX to a touch node and may accumulate a touch sensing signal obtained from the touch node, based on pulse periods T of the touch driving signal PWM_TX. An accumulation operation on the touch sensing signal may be performed by a preamplifier circuit PAMP and an integral circuit ITG. The preamplifier circuit PAMP and the integral circuit ITG may be powered on by a power-on control signal SSU_PW and may perform the accumulation operation on the touch sensing signal.

Figure 7:
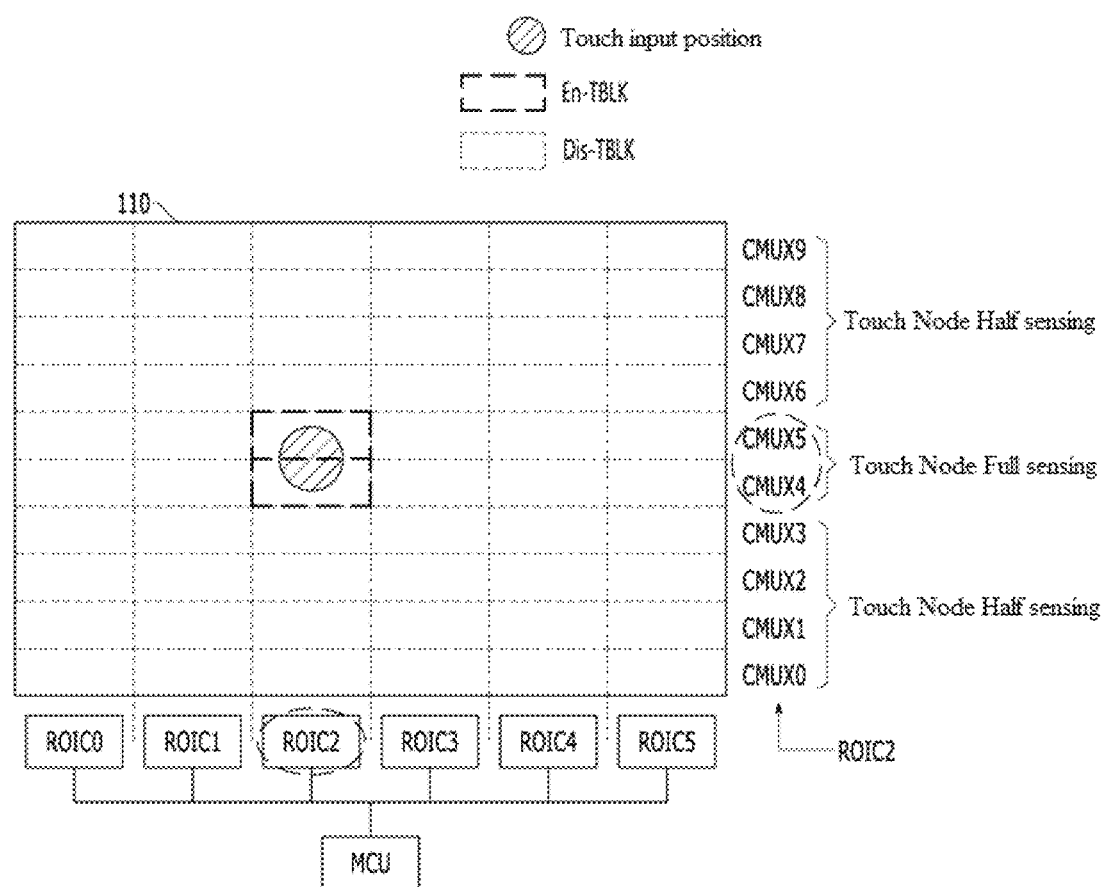
FIG. 7 is a diagram illustrating an example where an active touch block and an inactive touch block are differentiated from each other with respect to a touch input position.

FIG. 7 is a diagram illustrating an example where an active touch block and an inactive touch block are differentiated from each other with respect to a touch input position.

Referring to FIG. 7, a plurality of touch blocks TBLK may be divided into an active touch block En-TBLK and an inactive touch block Dis-TBLK. Here, a touch input position may be previously obtained through pre-sensing on all of the plurality of touch blocks TBLK. The pre-sensing may denote full node sensing on all touch nodes included in each of the plurality of touch blocks TBLK.

The active touch block En-TBLK may be a touch block which includes a touch input position checked through pre-sensing and may denote a region where a touch input occurs continuously.

The inactive touch block Dis-TBLK may be a touch block which does not include a touch input position obtained through pre-sensing and may denote a region which is estimated there to be no touch input.

As in FIG. 7, when a touch input position checked through pre-sensing corresponds to an ROIC2 in a column direction and corresponding to CMUX4-5 in a row direction, sensing circuits of the ROIC2 may full-sense touch nodes included in the active touch block En-TBLK for a first time and may half-sense touch nodes included in the inactive touch block Dis-TBLK for a second time, based on the touch driving signal. Here, the second time may be half of the first time, and thus, power consumed by the sensing circuits of the ROIC2 may be reduced.

Furthermore, sensing circuits of each of an ROIC0, an ROIC1, an ROIC3, an ROIC4, and an ROIC5 may correspond to only the inactive touch block Dis-TBLK, and thus, may half-sense touch nodes included in the inactive touch block Dis-TBLK for the second time, thereby decreasing power consumption through low power driving.

A plurality of sensing circuits included in an ROIC may be connected to the touch nodes included in the active touch block En-TBLK or may be connected to the touch nodes included in the inactive touch block Dis-TBLK, based on a channel multiplexer signal.

Figure 8A:
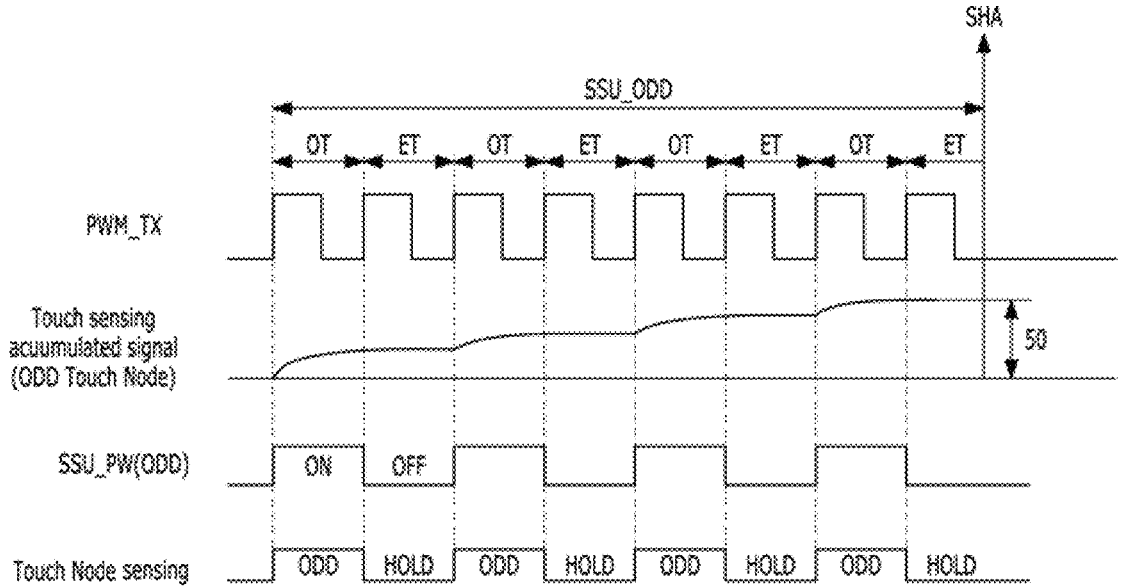
FIG. 8A is a diagram illustrating a half sensing operation of an odd sensing circuit which is powered on in only odd pulse periods of a touch driving signal.
Figure 8B:
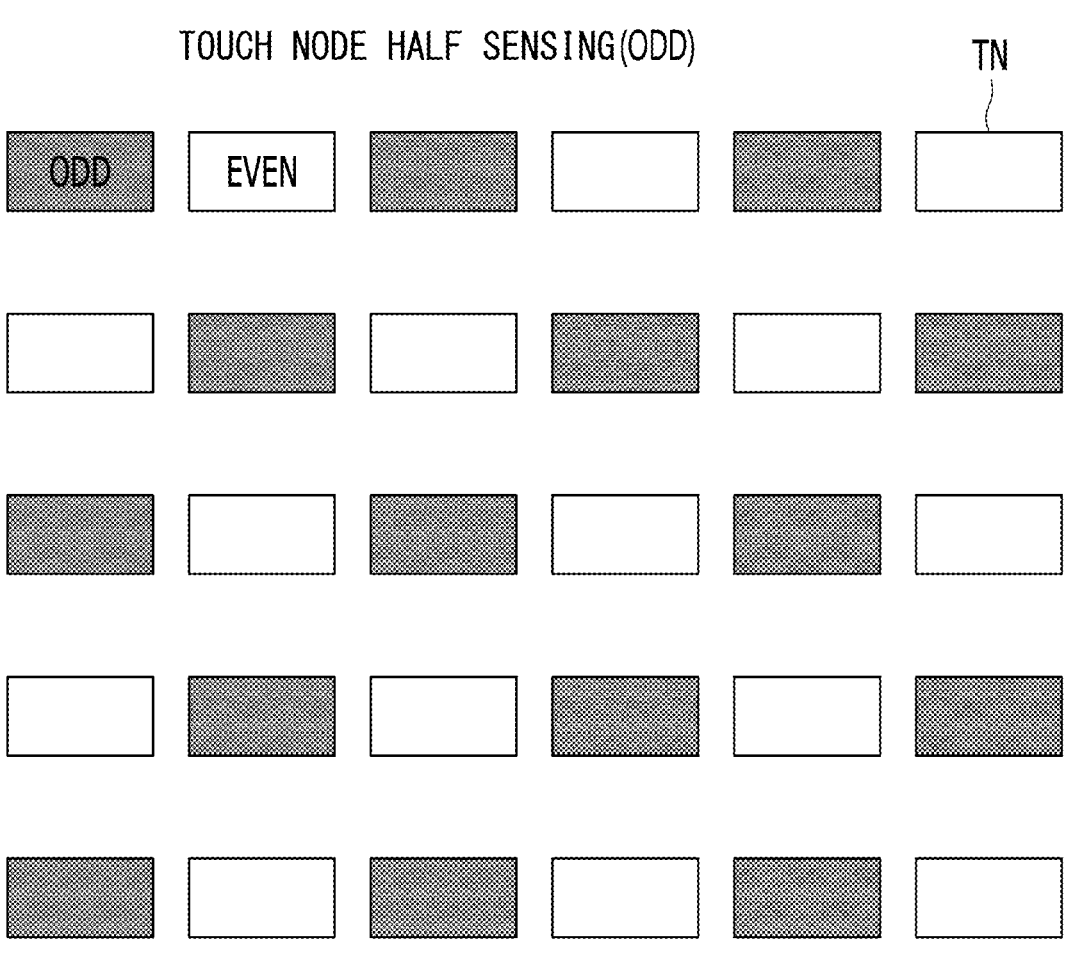
FIG. 8B is a diagram illustrating odd touch nodes of an inactive touch block which are connected to odd sensing circuits and half sensed.

FIG. 8A is a diagram illustrating a half sensing operation of an odd sensing circuit which is powered on in only odd pulse periods of a touch driving signal. FIG. 8B is a diagram illustrating odd touch nodes of an inactive touch block which are connected to odd sensing circuits and half sensed.

Referring to FIGS. 8A and 8B, a plurality of sensing circuits corresponding to an inactive touch block Dis-TBLK may include odd sensing circuits SSU_ODD which are connected to odd touch nodes TN included in the inactive touch block Dis-TBLK and are powered on in only odd pulse periods OT of a touch driving signal PWM_TX. The odd sensing circuits SSU_ODD may be powered off in even pulse periods ET of the touch driving signal PWM_TX and may contribute a reduction in power consumption.

A preamplifier PAMP and an integral circuit ITG included in each of the odd sensing circuits SSU_ODD may be powered on in only the odd pulse periods OT of the touch driving signal PWM_TX in response to a power-on control signal SSU_PW which is powered on in only the odd pulse periods OT of the touch driving signal PWM_TX and are powered off in the even pulse periods ET of the touch driving signal PWM_TX. As a result, the odd sensing circuits SSU_ODD may accumulate a touch sensing signal in only the odd pulse periods OT of the touch driving signal PWM_TX and may stop an accumulation operation in the even pulse periods ET of the touch driving signal PWM_TX. The odd sensing circuits SSU_ODD may stop the accumulation operation in the even pulse periods ET of the touch driving signal PWM_TX and may hold a touch sensing signal accumulated until the accumulation operation stops.

The odd sensing circuits SSU_ODD may skip a pulse period of the touch driving signal PWM_TX one-by-one and may perform half sensing. Such a half sensing method may decrease, by half, a final level 50 of a touch sensing accumulation signal compared to a full sensing method which senses all of entire pulse periods of the touch driving signal PWM_TX.

Figure 9A:
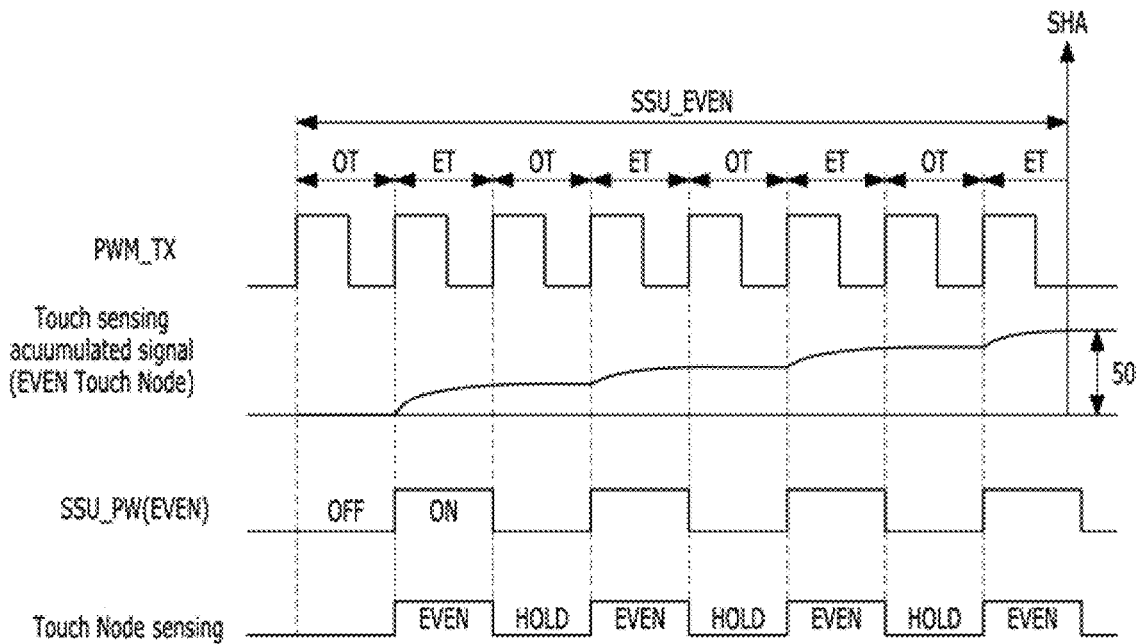
FIG. 9A is a diagram illustrating a half sensing operation of an even sensing circuit which is powered on in only even pulse periods of a touch driving signal.
Figure 9B:
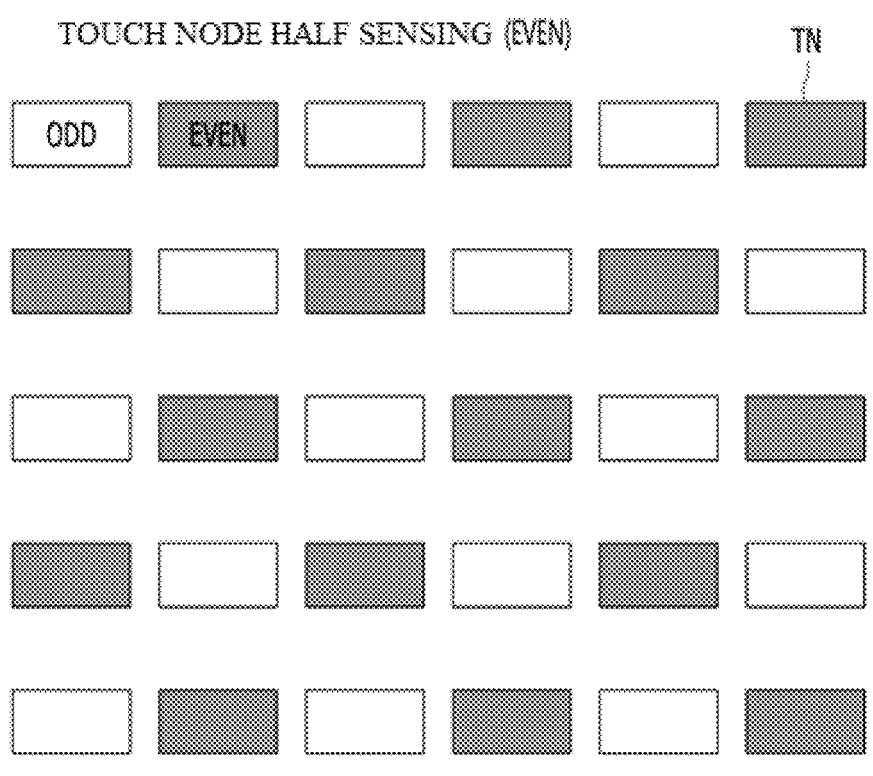
FIG. 9B is a diagram illustrating even touch nodes of an inactive touch block which are connected to even sensing circuits and half sensed.

FIG. 9A is a diagram illustrating a half sensing operation of an even sensing circuit which is powered on in only even pulse periods of a touch driving signal. FIG. 9B is a diagram illustrating even touch nodes of an inactive touch block which are connected to even sensing circuits and half sensed.

Referring to FIGS. 9A and 9B, a plurality of sensing circuits corresponding to an inactive touch block Dis-TBLK may include even sensing circuits SSU_EVEN which are connected to even touch nodes TN included in the inactive touch block Dis-TBLK and are powered on in only even pulse periods ET of a touch driving signal PWM_TX. The even sensing circuits SSU_EVEN may be powered off in odd pulse periods OT of the touch driving signal PWM_TX and may contribute a reduction in power consumption.

A preamplifier PAMP and an integral circuit ITG included in each of the even sensing circuits SSU_EVEN may be powered on in only the even pulse periods ET of the touch driving signal PWM_TX in response to a power-on control signal SSU_PW which is powered on in only the even pulse periods ET of the touch driving signal PWM_TX and are powered off in the odd pulse periods OT of the touch driving signal PWM_TX. As a result, the even sensing circuits SSU_EVEN may accumulate a touch sensing signal in only the even pulse periods ET of the touch driving signal PWM_TX and may stop an accumulation operation in the odd pulse periods OT of the touch driving signal PWM_TX. The even sensing circuits SSU_EVEN may stop the accumulation operation in the odd pulse periods OT of the touch driving signal PWM_TX and may hold a touch sensing signal accumulated until the accumulation operation stops.

The even sensing circuits SSU_EVEN may skip a pulse period of the touch driving signal PWM_TX one-by-one and may perform half sensing. Such a half sensing method may decrease, by half, a final level 50 of a touch sensing accumulated signal compared to a full sensing method which senses all of entire pulse periods of the touch driving signal PWM_TX.

The odd sensing circuits SSU_ODD and the even sensing circuits SSU_EVEN may skip the pulse period of the touch driving signal PWM_TX one-by-one and may perform half sensing, and in this case, may alternately perform half sensing at a period of one pulse period. Accordingly, low power driving may be performed without a reduction in touch resolution.

Figure 10:
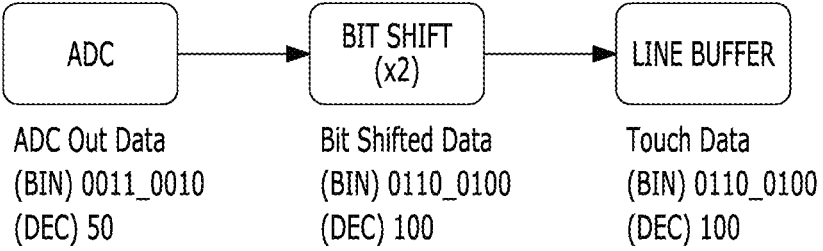
FIG. 10 is a diagram illustrating an overall circuit of the present disclosure for amplifying a half sensing output by two times.

FIG. 10 is a diagram illustrating an overall circuit of the present disclosure for amplifying a half sensing output by two times.

Referring to FIG. 10, the touch sensing display device according to the present disclosure may amplify a half sensing output by two times by using a bit shift circuit connected to an output terminal of the ADC.

The bit shift circuit may amplify a half sensing output 50 by two times and may store an amplified half sensing output in a line buffer, and thus, may compensate for a sensing output value, reduced due to half sensing, with a full sensing level 100. Accordingly, power consumption may be efficiently reduced without the occurrence of an error between touch sensing data obtained in the active touch block En-TBLK and touch sensing data obtained in the inactive touch block Dis-TBLK.

Figure 11A:
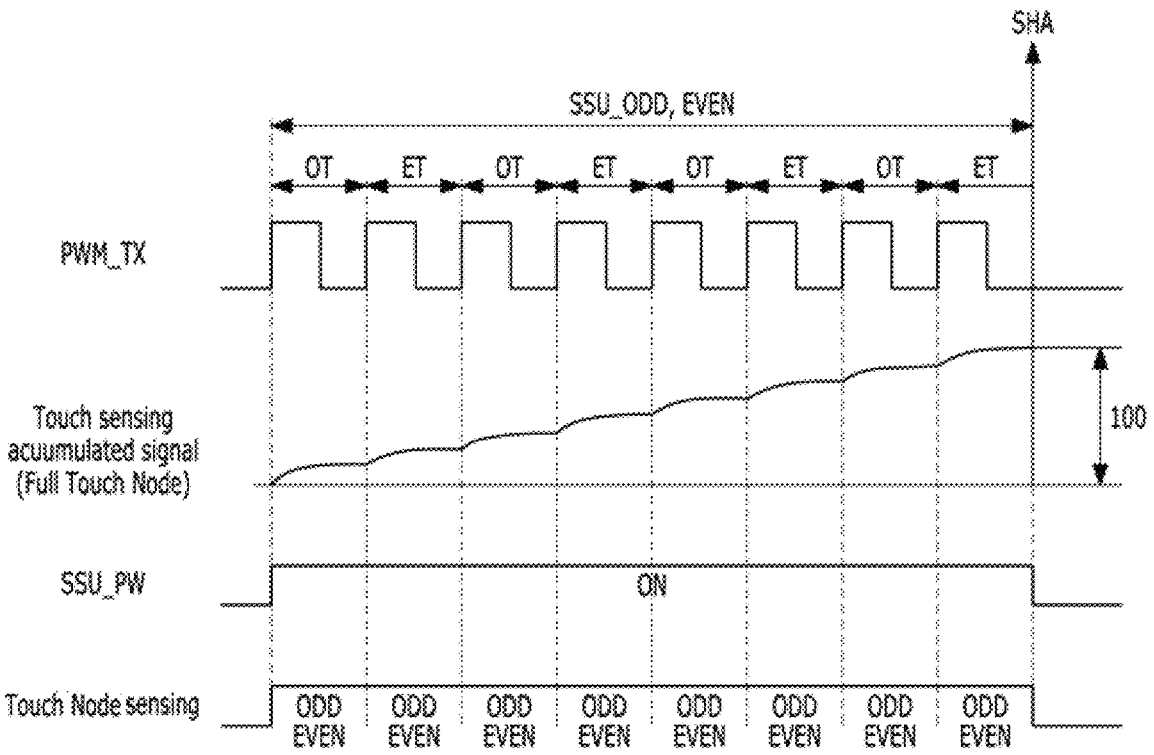
FIG. 11A is a diagram illustrating a full sensing operation of a sensing circuit which is powered on in entire pulse periods of a touch driving signal.
Figure 11B:
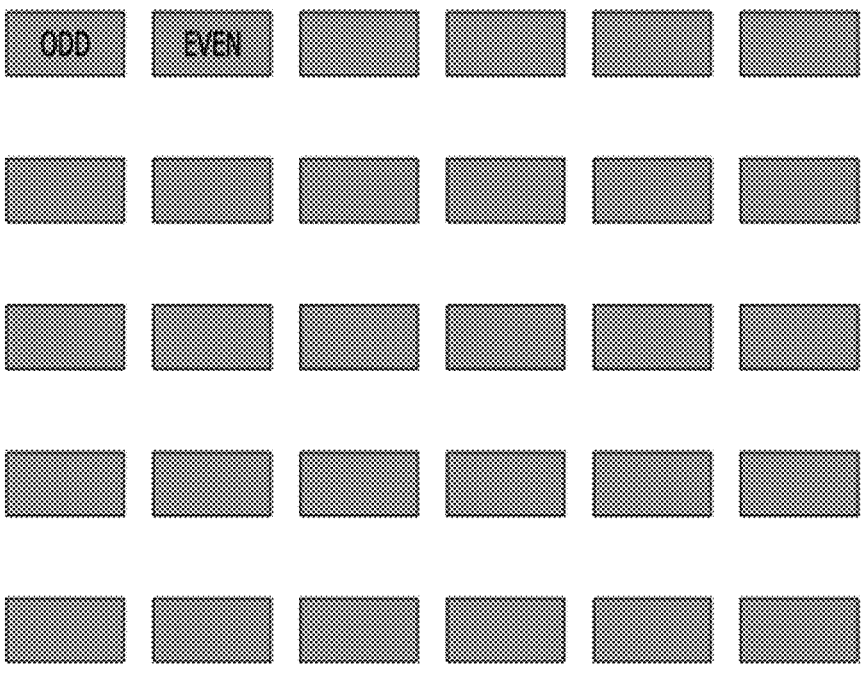
FIG. 11B is a diagram illustrating all touch nodes of an active touch block which is connected to sensing circuits and full-sensed.

FIG. 11A is a diagram illustrating a full sensing operation of a sensing circuit which is powered on in entire pulse periods of a touch driving signal. FIG. 11B is a diagram illustrating all touch nodes of an active touch block which is connected to sensing circuits and full-sensed.

Referring to FIGS. 11A and 11B, a plurality of sensing circuits corresponding to an active touch block En-TBLK may be connected to entire touch nodes TN included in the active touch block En-TBLK. Odd sensing circuits SSU_ODD of the plurality of sensing circuits may be connected to odd touch nodes TN included in the active touch block En-TBLK, and even sensing circuits SSU_EVEN of the plurality of sensing circuits may be connected to even touch nodes TN included in the active touch block En-TBLK.

The odd sensing circuits SSU_ODD and the even sensing circuits SSU_EVEN may maintain a power-on state in entire pulse periods of a touch driving signal PWM_TX.

A preamplifier PAMP and an integral circuit ITG included in each of the odd sensing circuits SSU_ODD and the even sensing circuits SSU_EVEN may be powered on in the entire pulse periods of the touch driving signal PWM_TX. As a result, the odd sensing circuits SSU_ODD and the even sensing circuits SSU_EVEN may accumulate a touch sensing signal in the entire pulse periods of the touch driving signal PWM_TX. Such a method may be a method which full-senses all of the entire pulse periods of the touch driving signal PWM_TX.

Figure 12:
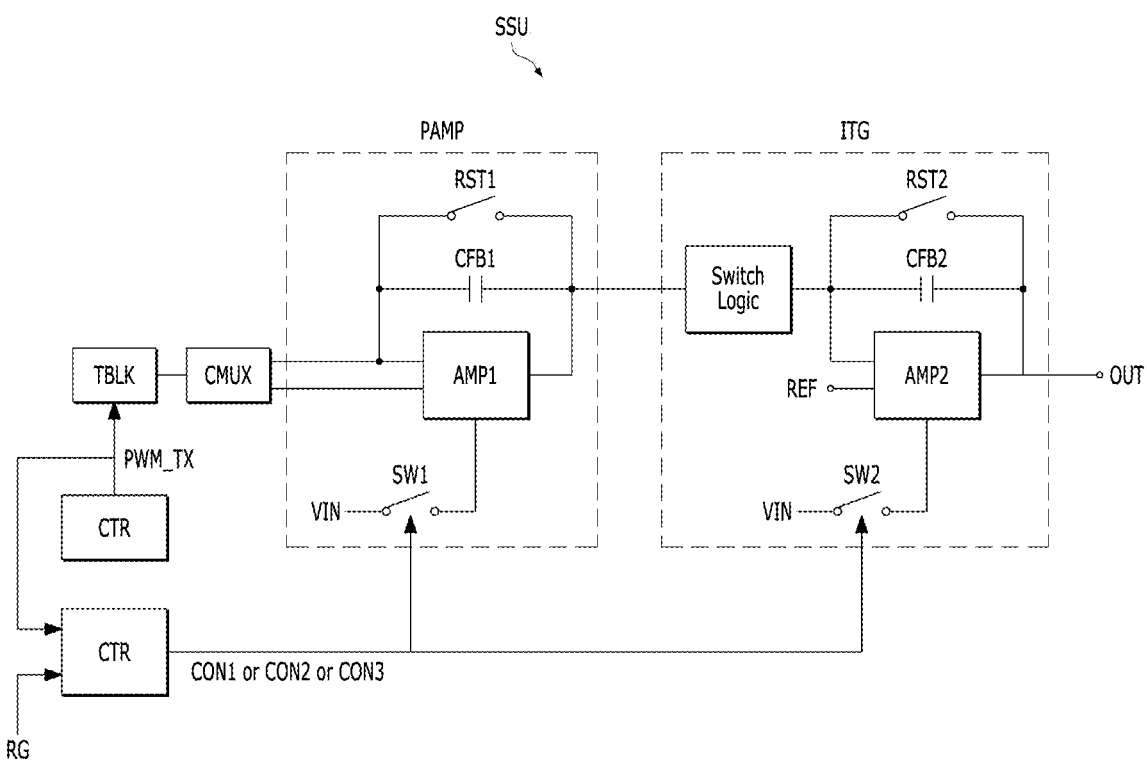
FIG. 12 is a diagram illustrating a detailed configuration of one sensing circuit.
Figure 13:
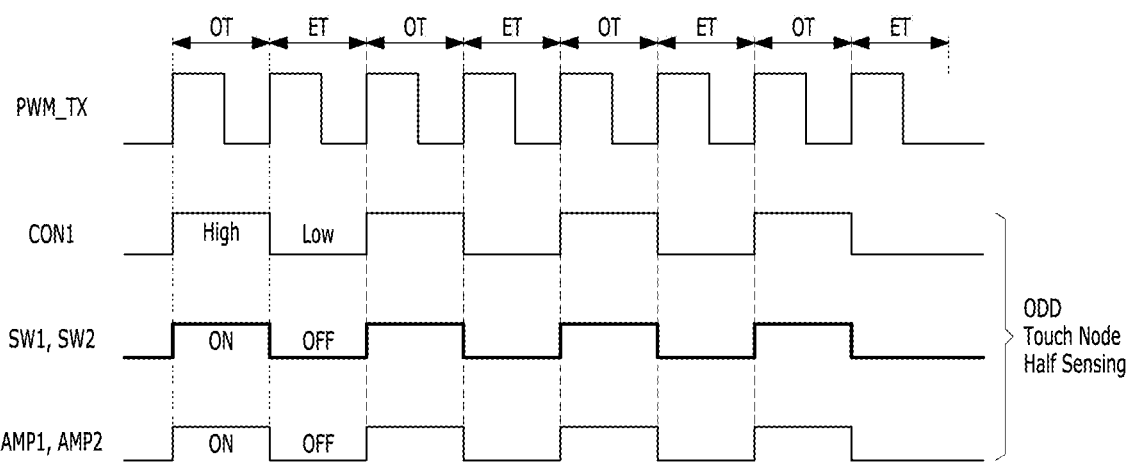
FIG. 13 is a diagram illustrating an example where first and second switches of one sensing circuit are powered on by a first switch control signal in only odd pulse periods of a touch driving signal.
Figure 14:
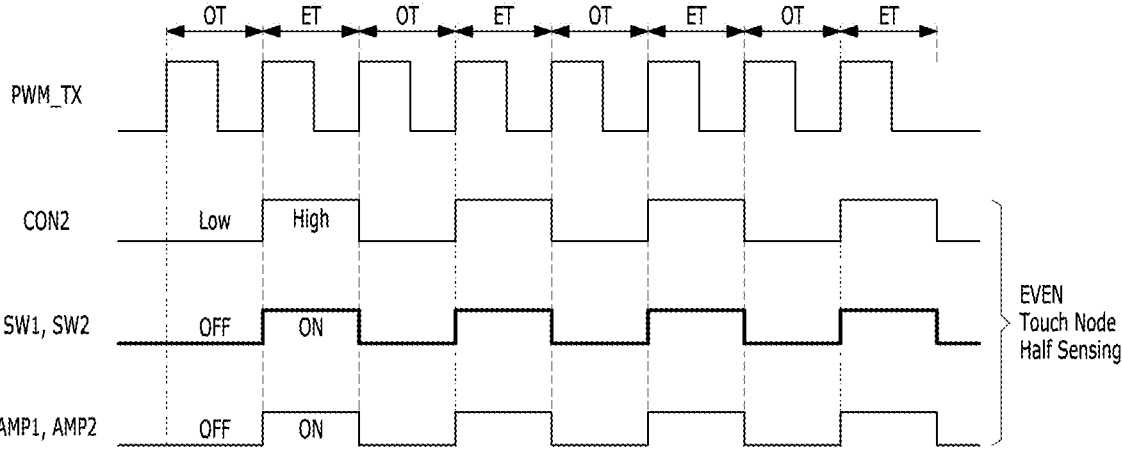
FIG. 14 is a diagram illustrating an example where first and second switches of one sensing circuit are powered on by a second switch control signal in only even pulse periods of a touch driving signal.
Figure 15:
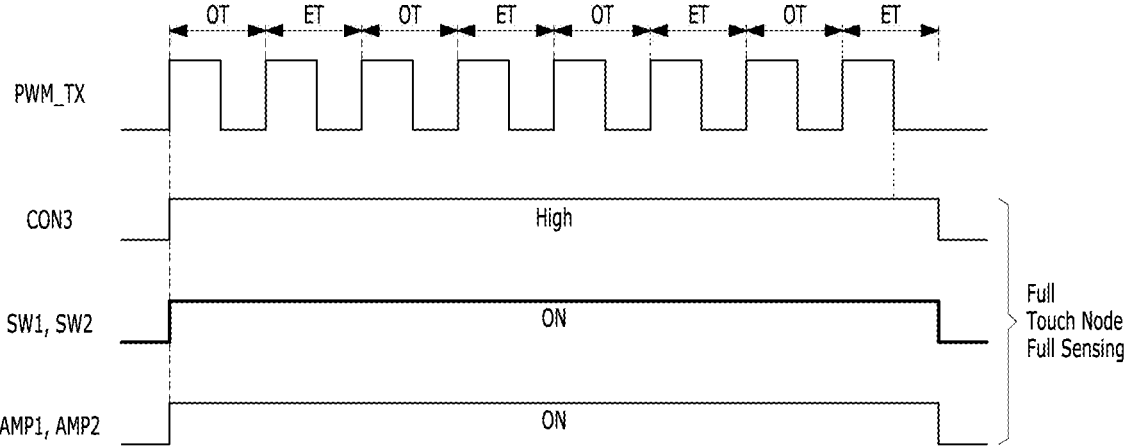
FIG. 15 is a diagram illustrating an example where first and second switches of one sensing circuit are powered on by a third switch control signal in entire pulse periods of a touch driving signal.

FIG. 12 is a diagram illustrating a detailed configuration of one sensing circuit. FIG. 13 is a diagram illustrating an example where first and second switches of one sensing circuit are powered on by a first switch control signal in only odd pulse periods of a touch driving signal. FIG. 14 is a diagram illustrating an example where first and second switches of one sensing circuit are powered on by a second switch control signal in only even pulse periods of a touch driving signal. FIG. 15 is a diagram illustrating an example where first and second switches of one sensing circuit are powered on by a third switch control signal in entire pulse periods of a touch driving signal.

Referring to FIG. 12, a sensing circuit SSU according to the present disclosure may include a preamplifier circuit PAMP, an integral circuit ITG, a driving signal generator CTX, and a control signal generator CTR.

The preamplifier circuit PAMP may include a first amplifier AMP1 and a first switch SW1 which switches a driving power VIN input to the first amplifier AMP1. A first feedback capacitor CFB1 and a first reset switch RST1 may be connected in parallel between an input terminal and an output terminal of the first amplifier AMP1.

The integral circuit ITG may include a second amplifier AMP2 and a second switch SW2 which switches the driving power VIN input to the second amplifier AMP2. A second feedback capacitor CFB2 and a second reset switch RST2 may be connected in parallel between an input terminal and an output terminal of the second amplifier AMP2.

The control signal generator CTR may generate the touch driving signal PWM_TX having a plurality of pulse periods to supply to touch blocks TBLK of a display panel.

The control signal generator CTR may generate a first switch control signal CON1 for half-sensing odd touch nodes or a second switch control signal CON2 for half-sensing even touch nodes or a third switch control signal CON3 for full-sensing all touch nodes, based on the touch driving signal PWM_TX and register information RG about a touch input position obtained through pre-sensing.

The first switch SW1 of the preamplifier APMP and the second switch SW2 of the integral circuit ITG may be simultaneously turned on or off by one of the first to third switch control signals CON1 to CON3.

Referring to FIG. 13, the first switch control signal CONT1 may have a high level (or an on level) in the odd pulse periods OT of the touch driving signal PWM_TX and may have a low level (or an off level) in the even pulse periods ET of the touch driving signal PWM_TX.

The first and second switches SW1 and SW2 may be simultaneously powered on in the odd pulse periods OT of the touch driving signal PWM_TX and may be simultaneously powered off in the even pulse periods ET of the touch driving signal PWM_TX, by the first switch control signal CON1. Therefore, the first and second amplifiers AMP1 and AMP2 may be simultaneously powered on in the odd pulse periods OT of the touch driving signal PWM_TX and may be simultaneously powered off in the even pulse periods ET of the touch driving signal PWM_TX.

As a result, the preamplifier PAMP and the integral circuit ITG may half-sense odd touch nodes of an inactive touch block in the odd pulse periods OT of the touch driving signal PWM_TX to output a touch sensing accumulated signal of a half level.

Referring to FIG. 14, the second switch control signal CONT2 may have a high level (or an on level) in the even pulse periods ET of the touch driving signal PWM_TX and may have a low level (or an off level) in the odd pulse periods OT of the touch driving signal PWM_TX.

The first and second switches SW1 and SW2 may be simultaneously powered on in the even pulse periods ET of the touch driving signal PWM_TX and may be simultaneously powered off in the odd pulse periods OT of the touch driving signal PWM_TX, by the second switch control signal CON2. Therefore, the first and second amplifiers AMP1 and AMP2 may be simultaneously powered on in the even pulse periods ET of the touch driving signal PWM_TX and may be simultaneously powered off in the odd pulse periods OT of the touch driving signal PWM_TX.

As a result, the preamplifier PAMP and the integral circuit ITG may half-sense even touch nodes of the inactive touch block in the even pulse periods ET of the touch driving signal PWM_TX to output a touch sensing accumulated signal of a half level.

Referring to FIG. 15, the third switch control signal CON3 may have a high level (or an on level) in the entire pulse periods OT and ET of the touch driving signal PWM_TX.

The first and second switches SW1 and SW2 may be simultaneously powered on by the third switch control signal CON3 in the entire pulse periods of the touch driving signal PWM_TX. Therefore, the first and second amplifiers AMP1 and AMP2 may be simultaneously powered on in the entire pulse periods of the touch driving signal PWM_TX.

As a result, the preamplifier PAMP and the integral circuit ITG may full-sense entire touch nodes of an active touch block in the entire pulse periods of the touch driving signal PWM_TX to output a touch sensing accumulated signal of a full level.

Figure 16:
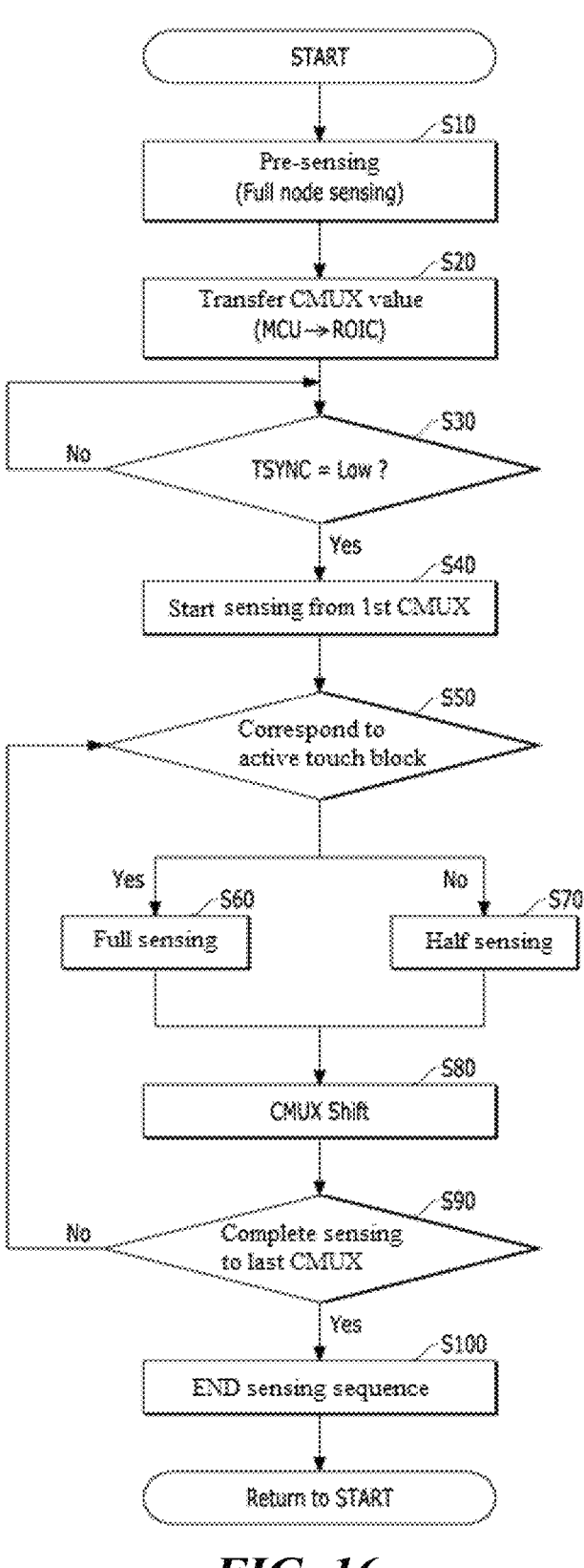
FIG. 16 is a diagram illustrating a sensing sequence according to the present disclosure.

FIG. 16 is a diagram illustrating a sensing sequence according to the present disclosure.

Referring to FIG. 16, a channel multiplexer value (i.e., a touch input position) where a touch input occurs may be obtained by an MCU through a pre-sensing process based on full node sensing, and then, the touch input position may be transferred to a corresponding ROIC (S10 and S20). The corresponding ROIC may record the touch input position in an internal register. For example, "0000110000" may be recorded in an internal register of the ROIC2 in FIG. 7. In this case, "0000110000" may represent that a channel multiplexer corresponding to the touch input position is a CMUX4 and a CMUX5.

The ROIC may start a touch sensing operation on a touch block corresponding to a first channel multiplexer in a low period L of a touch synchronization signal TSYNC (S30 and S40).

The ROIC may check whether a current channel multiplexer corresponds to an active touch block including the touch input position (S50).

When the current channel multiplexer corresponds to the active touch block, the ROIC may full-sense touch nodes included in the active touch block (S60).

When the current channel multiplexer corresponds to an inactive touch block instead of the active touch block, the ROIC may half-sense touch nodes included in the inactive touch block (S70).

The ROIC may repeat the above-described sensing process up to a last channel multiplexer while shifting a channel multiplexer CMUX (S80).

When the sensing process on the last channel multiplexer is completed, the ROIC may end a sensing sequence (S90 and S100).

The present disclosure may realize the following effects.

Based on channel multiplexer information which corresponds to a touch input position and is input from an MCU, the present disclosure may full-sense all touch nodes on an active touch block where the occurrence of a touch event is estimated, may divide touch nodes into odd touch nodes and even touch nodes in a chess board mode form on an inactive touch block where the nonoccurrence of a touch event is estimated, and may alternately turn on or off sensing circuits according to a pulse period of a touch driving signal to perform half sensing, thereby reducing the power consumption of a sensing circuit.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure including those of the following claims.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch sensing display device comprising:
a display panel including a plurality of touch blocks including at least one active touch block and at least one inactive touch block with respect to a touch input position, each touch block including a plurality of touch nodes;
a plurality of sensing circuits configured to full-sense touch nodes of the active touch block for a first time and half-sense touch nodes of the inactive touch block for a second time, based on a touch driving signal; and
a bit shift circuit configured to amplify a half sensing output by two times and store an amplified half sensing output in a buffer,
wherein the first time corresponds to an entire pulse period of the touch driving signal, and
the second time corresponds to an odd pulse period or an even pulse period of the touch driving signal.

2. The touch sensing display device of claim 1, wherein the second time is half of the first time,
an active touch block overlaps the touch input position, and
the inactive touch block does not overlap the touch input position.

3. The touch sensing display device of claim 1, wherein the touch input position is configured to be previously obtained through pre-sensing on all of the plurality of touch blocks.

4. The touch sensing display device of claim 1, wherein the plurality of sensing circuits are connected to touch nodes of the active touch block or touch nodes of the inactive touch block, based on a channel multiplexer signal.

5. The touch sensing display device of claim 4, wherein the plurality of sensing circuits comprise:

odd sensing circuits connected to odd touch nodes of the inactive touch block and configured to be powered on in only odd pulse periods of the touch driving signal; and even sensing circuits connected to even touch nodes of the inactive touch block and configured to be powered on in only even pulse periods of the touch driving signal, and wherein the odd touch nodes and the even touch nodes of the inactive touch block are alternately arranged in a chess board pattern.

6. The touch sensing display device of claim 5, wherein the odd sensing circuits are configured to be powered off in even pulse periods of the touch driving signal, and the even sensing circuits are configured to be powered off in odd pulse periods of the touch driving signal.

7. The touch sensing display device of claim 1, wherein each of the plurality of sensing circuits comprise:

a preamplifier circuit including a first amplifier and a first switch configured to switch a driving power input to the first amplifier;

an integral circuit including a second amplifier and a second switch configured to switch a driving power input to the second amplifier;

a driving signal generator configured to generate the touch driving signal which is to be supplied to the plurality of touch nodes; and a control signal generator configured to output a switch control signal for simultaneously powering on or off the first and second switches, based on the touch input position and the touch driving signal.

8. The touch sensing display device of claim 7, wherein the first and second switches are configured to be powered on in entire pulse periods of the touch driving signal, and the preamplifier and the integral circuit are configured to full-sense the touch nodes of the active touch block for the first time to output a touch sensing accumulated signal of a full level.

9. The touch sensing display device of claim 7, wherein the first and second switches are configured to be powered on in only odd pulse periods of the touch driving signal, and the preamplifier and the integral circuit are configured to half-sense the odd touch nodes of the inactive touch block for the second time to output a touch sensing accumulated signal of a half level.

10. The touch sensing display device of claim 7, wherein the first and second switches are configured to be powered on in only even pulse periods of the touch driving signal, and the preamplifier and the integral circuit are configured to half-sense the even touch nodes of the inactive touch block for the second time to output a touch sensing accumulated signal of a half level.

11. The touch sensing display device of claim 3, wherein the pre-sensing is full node sensing on all touch nodes of the plurality of touch blocks.

* * * * *